United States Patent [19]

Warner et al.

[11] Patent Number: 5,788,900
[45] Date of Patent: Aug. 4, 1998

[54] METHOD OF MAKING A PLATEAU HONING TOOL

[75] Inventors: R. Brown Warner, Westlake; Joseph P. Gaser, Euclid, both of Ohio

[73] Assignee: Jason, Inc., Cleveland, Ohio

[21] Appl. No.: 736,046

[22] Filed: Oct. 22, 1996

Related U.S. Application Data

[62] Division of Ser. No. 90,770, Jul. 13, 1993.

[51] Int. Cl.⁶ .................................................. B29C 37/02
[52] U.S. Cl. ............... 264/138; 264/328.1; 264/328.14; 264/162; 51/298; 51/300
[58] Field of Search .......................... 264/446, 478, 264/139, 162, 138, 328.1, 328.14; 51/298, 299, 300

[56] References Cited

U.S. PATENT DOCUMENTS 4,627,950  12/1986  Matsui et al. ........................ 264/103

*Primary Examiner*—Christopher A. Fiorilla
*Attorney, Agent, or Firm*—Renner, Otto, Boisselle, Sklar

[57] ABSTRACT

An injection molded disposable honing tool is made by an injection molding process. The tool has an elongated rectangular base from which projects an elongated section which may be somewhat smaller. The elongated section terminates in a working face. The entire tool may incorporate abrasive therein homogeneously or simply the elongated section which terminates in the working face. A shot of a plastic melt such as nylon is formed with abrasive mixed homogeneously which is then injected into a mold. For higher cost abrasive, a two shot process may be used with one shot being abrasive free. Alternatively, an abrasive-free insert may be placed in the mold before the abrasive mix is injected. The surface of the working face may be formed to act as a working face of closely packed fingers by placing patterns in the mold surface forming the working face, or subsequently cutting the working face, or a combination of both.

5 Claims, 4 Drawing Sheets

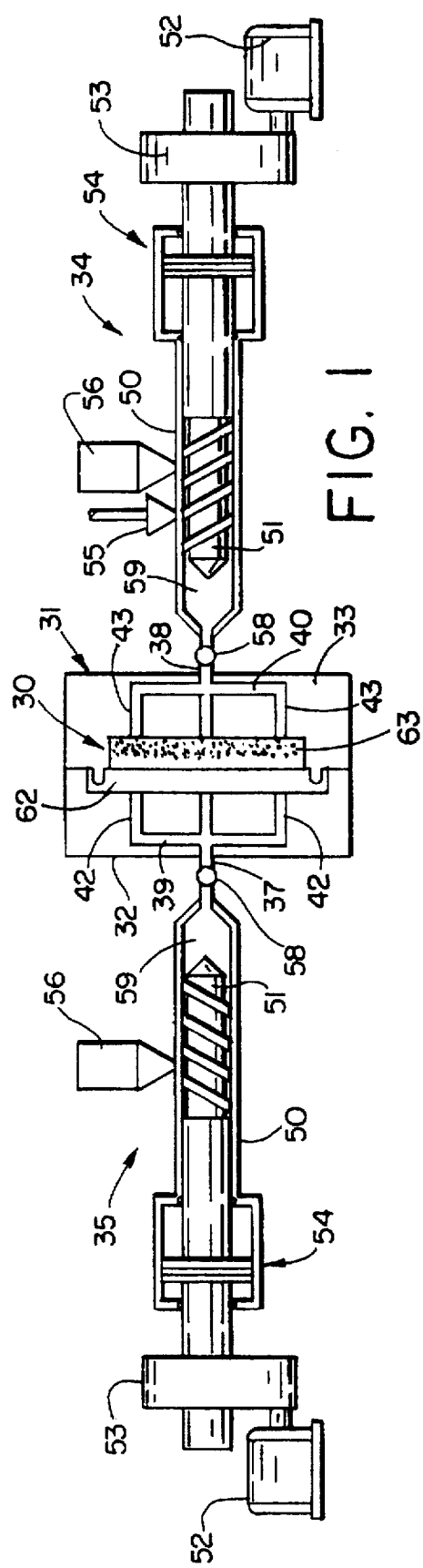
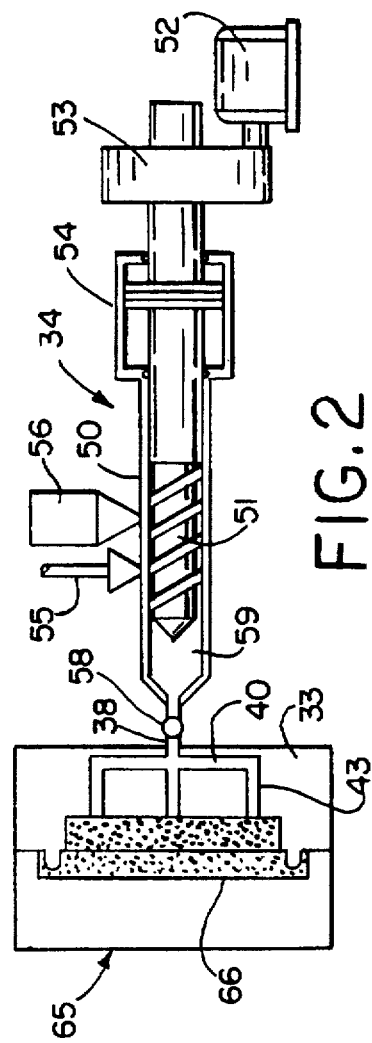

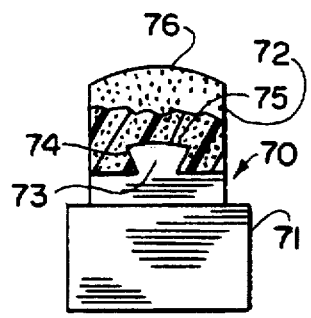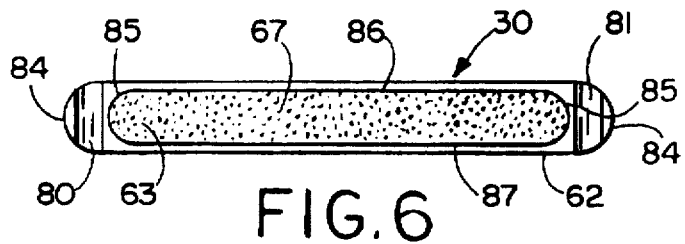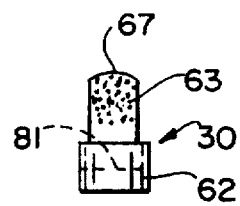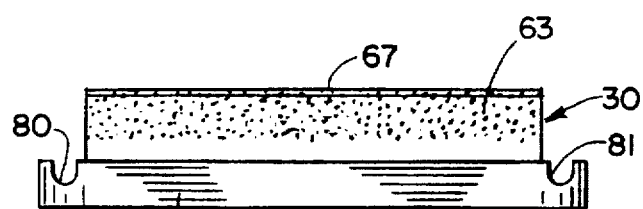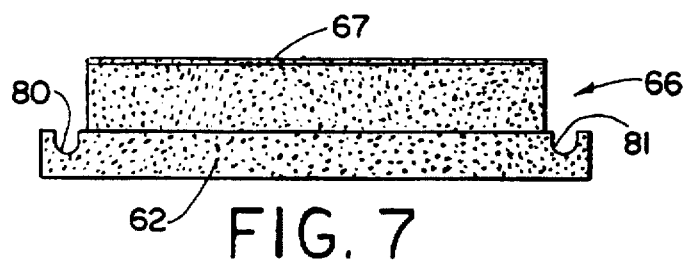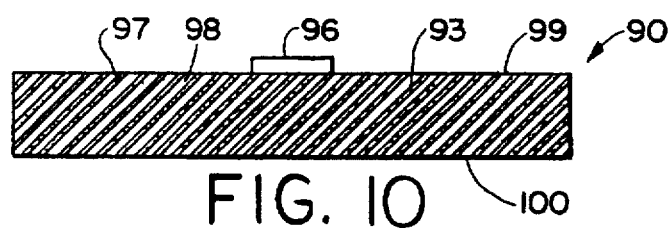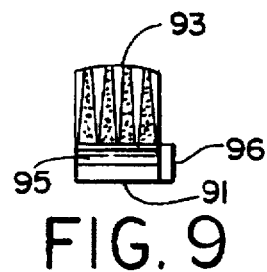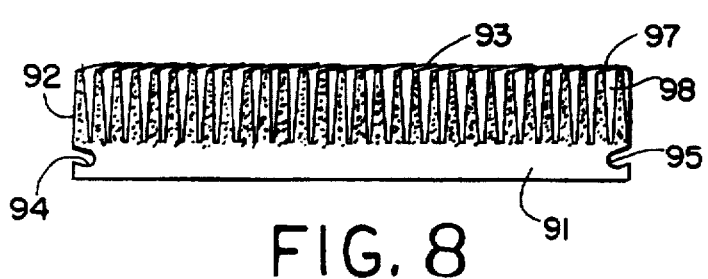

METHOD OF MAKING A PLATEAU HONING TOOL

This is a division of copending application Ser. No. 08/090,770, filed Jul. 13, 1993

DISCLOSURE

This invention relates generally as indicated to a honing tool, and more particularly a low cost disposable honing tool, and method of making the tool.

BACKGROUND OF THE INVENTION

Honing is used to correct hole geometry and also to prepare surfaces that require a specific finish or scratch pattern. Typical of the latter are piston bores or liners in internal combustion engines. On such oil lubricated moving part surfaces it is customary to provide what is known as a plateau finish. A plateau finish is similar to a conventional finish, except that the peaks have been removed or flattened out. The finish attempts to duplicate the finish after the engine has been broken in, and removes or smooths out metal that would otherwise be removed by piston rings. A proper plateau finish contributes to the mechanical and environmental efficiency of the engine. This is usually accomplished by a two stage honing process including rough and finish honing.

Conventional honing tools are usually conventional stones or plated superabrasive tools. Most stones use vitrified, metal or resins bonds, and are similar to hard grinding wheels. Plated honing tools normally make use of super abrasives and consist usually of a single layer of abrasive attached to a metal surface by electrolytic plating. Inspection of the surfaces after use of these tools sometimes finds abrasive grains embedded in the metal surface, even though the honing operation is done under constant flushing with a lubricant or coolant. Abrasive contact with piston rings or other moving parts leads to premature wear, blow-by, or mechanical inefficiency, as well as environmental problems.

More recently, there has been developed a unique honing tool useful as a secondary or tertiary step honing tool which produces a superior honing finish in high production situations. An example of this type of tool is shown in Scheider et al U.S. Pat. No. 5,216,847, issued Jun. 8, 1993. A process for using the tool shown in such patent is disclosed in the copending application of Carmichael et al Ser. No. 07/941, 544 filed Sep. 8, 1992, entitled "Honing Process" now U.S. Pat. No. 5,331,775.

There is also disclosed in the copending application of Tyler et al Ser. No. 08/052,366, filed Apr. 23, 1993 now U.S. Pat. No. 5,527,213, entitled "Honing Tool and Method of Making", a somewhat similar disposable honing tool for honing operations less exacting than high production operations.

The tool described in the above patents or copending applications comprises a bundle of tightly packed parallel monofilaments of relatively short extent, which bundle is secured in a holder. The holder is in turn mounted in the honing machine head and driven for rotation and reciprocation within the bore. The tightly packed tips of the monofilaments of the projecting bundle form the working face of the tool. The material of the monofilaments is nylon or other suitable fairly rigid and tough plastic, having the abrasive mineral or grain homogeneously entrained therein throughout. The monofilament may have as much as about 30 to about 45% by weight of abrasive material. The compacted tips provide a working face which has sufficient flexibility or softness to avoid planting abrasive in the work surface, and yet which is aggressive enough to form the proper surface and plateau finish. The compacted finger-like elements add stiffness and a degree of compliance to the tool. The compliance allows the tool to travel the surface and condition it even though it may have indentations and waviness.

SUMMARY OF INVENTION

A method of making a low cost disposable honing tool is disclosed which includes forming a homogeneous mixture of a plastic melt and an abrasive material, and then injecting the mixture at high pressure into a mold to form the tool. The mold is cooled and the tool is removed.

The cavity into which the mixture is injected typically forms an elongated base and an elongated projecting section which terminates in the working face of the tool. Where the abrasive is inexpensive and may actually be less costly than the plastic material it displaces, the abrasive may extend throughout the cavity. Where a high cost super-abrasive is employed such as CBN or diamond, the abrasive may be limited to the projecting section which extends to the working face, since the tool is designed to be disposable when worn out. Alternatively, the disposed tools may be recycled to recover high cost abrasive material therefrom.

One of the features which makes the noted prior art tool so effective is the closely packed tip working face. The filaments may be round, rectangular, or other transverse or sectional configurations, but they are generally arranged in the bundle in a random, though closely packed fashion. A similar, yet improved, working face may be achieved with the present invention. The working face may be formed of high density tips of round, rectangular, pyramid, or other configuration or section, but may also be formed in rows or patterns not readily achievable with the prior art tool.

The tool in its simplest form may have a plane working face, preferable transversely arcuate at least in part to match the curvature of the bore. The tool is then a plastic/abrasive block. After injection molding, the section projecting from the base may be slit to form juxtaposed fingers. The fingers may preferably be formed by diagonal slits going from one side of the elongated projecting portion of the tool to the other. Optionally, a crisscross diagonal or rectilinear pattern may be employed to form smaller, more flexible fingers.

Alternatively, the mold cavity may include a patterned working face which enables round, pyramid or other shape projections to be formed in substantially any pattern. In one form, the fingers may extend diagonally from side-to-side of the projecting section with relatively deep slots therebetween. Since the fingers tend to support each other, the width and depth of the slots in part controls the flexibility of the fingers and also enables coolant to flush by more closely to the working tips of the fingers. The fingers may also be formed with a combination of molding and cutting.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIG. 1 is a schematic illustration of a dual injection system for making a honing tool in accordance with the present invention wherein a portion of the tool to the working face includes the abrasive, the base being essentially abrasive free;

FIG. 2 is a similar schematic illustration of a single injection process in accordance with the present invention where the entire tool includes the abrasive material;

FIG. 3 is an illustration of a tool using an insert placed in the mold to form an abrasive-free base, the balance of the tool being formed with a single injection process;

FIG. 4 is an enlarged side elevation of a tool made by the process of FIG. 1;

FIG. 5 is an end elevation of the tool of FIG. 4;

FIG. 6 is a top plan view of the tool of FIG. 4;

FIG. 7 is an enlarged side elevation of a tool made by the process of FIG. 2;

FIG. 8 is a side elevation of a different form of tool using deep diagonal grooves to form wide diagonal fingers in the working face;

FIG. 9 is an end elevation of the tool of FIG. 8;

FIG. 10 is a top plan view of the tool of FIG. 8;

DETAILED DESCRIPTION OF THE PREFERRED EMBODIMENTS

Figure 11:
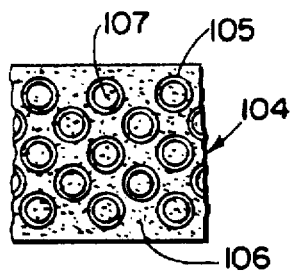
FIGS. 11–15 are fragmentary top plan views of various working faces which may be formed with the present invention.

Referring initially to FIG. 1, the honing tool shown generally at 30 is formed in a mold shown generally at 31 which comprises mold halves 32 and 33 mounted for opening and closing in the clamp (not shown) of a dual reciprocating screw molding machine, the two units of which are shown generally at 34 and 35. Both mold halves are provided with an inlet as seen at 37 and 38, respectively, each leading to manifolds 39 and 40, and from which extend a plurality of runners seen at 42 and 43 leading from the manifold to the mold cavity.

Each unit of the dual machine is essentially the same. The unit 34 comprises a barrel 50 in which screw 51 rotates and reciprocates, rotation being obtained by the motor 52 through transmission 53, while reciprocation is obtained by hydraulic piston-cylinder assembly shown generally at 54, the piston being part of the screw-ram. Mounted on top of the barrel for the unit 34 are fill hoppers for abrasive seen at 55 and for plastic pellets seen at 56. The abrasive particles are fed into the barrel as close to the screw tip as possible to reduce the amount of wear. In practice the screw may have a wear resistant replaceable tip. As is conventional, the barrel of the extruder is selectively heated while the mold is selectively cooled.

A cycle of operation starts with the shut-off valve 58 closed and the screw forward and rotating. As the abrasive-plastic melt homogeneous mixture is formed by the screw and screw flights, it is conveyed to the injection end of the barrel and the screw retracts as it is rotating forming a shot of the abrasive-resin melt mix in chamber 59. When the shot has been prepared, the valve opens and the screw moves forward acting as a ram to inject the shot into the mold under high pressure. The valve then closes and the screw continues to rotate to prepare the next shot. In the meantime, after cooling, the mold is opened and the honing tool 30 removed. If material in the runner is also removed, and trimmed from the honing tool, it may be pelletized and recycled through the machine unit.

The unit 35 is identical to the unit 34 and accordingly the same reference numbers are employed for similar components. The only difference is that there is no abrasive fill hopper and the plastic melt and shot is abrasive free. It will also be appreciated that the units will not normally be axially aligned and opposed as shown, but that the runners or sprues of the abrasive-free melt from unit 35 will enter through the bottom of the tool and those of the abrasive-melt mix unit 34 will enter from the top of the tool through the working face as described below. As illustrated in FIG. 1, the tool 30 has an essentially abrasive-free base 62 which is somewhat larger than the projecting section 63 which terminates in the working face.

With reference to FIG. 2, it will be noted that the machine and mold is identical to the right hand side of FIG. 1. The only difference is that the mold half 65 has no runners or sprues; only vents, not shown. The machine unit is also adjusted to form a larger shot since the entire tool 66 is formed with the abrasive-resin mix.

The tool 30 formed by the process of FIG. 1 is illustrated in greater detail in FIGS. 4, 5, and 6 while the tool 66 formed by the process of FIG. 2 is illustrated in FIG. 7.

The major difference between the two tools is that the tool 30 has the homogeneous abrasive-plastic mix only in the projecting portion 63 which extends to the working face 67 of the tool. The tool 66 as seen in comparing FIGS. 4 and 7 has the abrasive-plastic homogeneous mix throughout. The process of FIG. 1 will be employed when the economics of the abrasive material dictate. For example, if super-abrasive material is employed, such as CBN or diamond material, then it is not economically feasible to incorporate that material in the base, since the tool is designed to be disposable when worn. However, if less costly abrasives such as aluminum oxide or silicon carbide are employed, such abrasive as a filler material may actually be less expensive than the plastic melt material and accordingly, the incorporation throughout the tool actually makes the tool less expensive to manufacture.

Although the dual injection process is one way to make an abrasive-free base, another way is illustrated in FIG. 3. The honing tool shown generally at 70 comprises an abrasive-free base 71 and an abrasive-plastic homogeneous mix 72, with the latter section being injection molded about the base 71 which is placed within the mold as an insert before the portion 72 is injected into the mold. The insert may also be injection molded but in a separate mold.

The insert may include a plurality of posts seen at 73 which include an undercut surface 74. In this manner, the injected abrasive-plastic melt is mechanically locked to the insert during the injection process. It is noted that the locking posts may be provided with slightly domed top surfaces 75 which correspond to the arcuate working face 76. The surface 75 may act as a wear indicator and when exposed it tells the operator that it is time to replace the tool.

Accordingly, in FIGS. 1 and 3 respectively, there is illustrated two methods for making a honing tool with an essentially abrasive-free base. As far as the tools hereinafter described are concerned, they may be made by any one of the methods disclosed.

It will be appreciated that the honing tools made by the process of the present invention are generally similar, but may vary in shape and configuration, depending primarily upon the type of honing machine and head employed.

As seen in FIGS. 4, 5 and 6, the honing tool comprises the abrasive-free base 62 which is in the form of a rectangular elongated block. The base includes upwardly outwardly facing transverse slots 80 and 81 at each end which may facilitate the mounting of the tool in the machine. The elongated rectangular base may also include other machine mountings and may even include projecting linear cams which react with conical cam actuators in the honing machine head. A somewhat smaller section projects from the base as indicated generally at 63, such section terminating in the working face 67. The working face may have an arcuate transverse profile which may be designed generally to correspond to the arcuate surface of the interior of a bore being honed. As illustrated in FIG. 6, the ends of the base and projecting sections of the elongated rectangular honing tool are rounded as seen at 84 and 85 respectively and the projecting portion and working face has two elongated parallel longer sides 86 and 87. The tool will be used within the bore normally, such that the long sides 86 and 87 extend parallel to the axis of the honing tool head and also the bore being honed.

The tool of FIG. 7 is identical in shape and configuration to the tool illustrated in FIGS. 4-6 and the only difference is that the tool of FIG. 7 has the homogeneous abrasive mixture throughout the base as well as the projection to the working face 67.

The tools illustrated in FIGS. 3-7 are in essence an abrasive block and the working face of the tool is untreated. An abrasive block with the preferred plastic nylon material has application in secondary honing, but it is preferred to treat the working face of the tool as hereinafter described to provide relatively closely spaced or packed projecting fingers or tips for engaging the work surface. The injection process of the present invention enables the working face of the tool to be configured in a wide variety of patterns. These patterns may be formed in whole or in part in the injection process by forming the desired results in the surface of the mold which forms the working face.

One such tool which can be formed with the injection process is illustrated in FIGS. 8, 9 and 10 at 90. The tool comprises a base 91 and a projecting section 92 which terminates in working face 93. The tool is in the form of an elongated rectangular block. The base may be provided with upwardly opening end slots 94 and 95 by means of which the tool is secured to the honing machine head. A lateral projection 96 extends from the base. Such projections are normally employed to provide clearance for suitable flow of the lubricant or coolant which continually flushes the honing operation.

The treatment afforded by the injection process is the formation of the working face into diagonally extending closely spaced rather wide fingers 97 which are separated by relatively deep slots 98. The fingers and slots extend at 45° diagonally to the long sides 99 and 100 of the rectangular honing tool. The slots 98 flare slightly toward the working face and provide clearance for coolant flow between the fingers. The spacing of the slots also permits the fingers to flex slightly before being contacted by and supported by the adjacent finger. It is preferred that the fingers extend diagonally because of the rotational and translational movements obtained by the honing machine head. The angle illustrated is 45° but a sharper angle such as 60° may be provided.

Referring now to FIGS. 11-15, there is illustrated a variety of working face configurations which may be obtained either directly by the injection process or by cutting the block following injection, or by a combination of injection and cutting. In each instance in FIGS. 11-15, the viewer is looking directly at the working face and the top and bottom linear edges represent the long sides of the rectangular tool.

In FIG. 11, the working face of tool 104 is composed of projecting circular in transverse section fingers shown at 105 which are arranged in a regular crisscrossing row pattern with such rows being at approximately 45° to the long sides of the tool. The fingers may be spaced approximately ½ to ⅓ the diameter of the fingers and they may project toward the viewer about half of the projecting portion extending from the base. This forms a shelf or surface from which the fingers project. It will be appreciated that the spacing of the fingers, their arrangement, and also their extent of projection may be varied. The longer the fingers project from the base or shelf 106, the more flexibility is afforded. In any event the crisscross pattern of the tips 107 of the fingers 105 form the working face of the tool and coolant is free to flow between the fingers.

Figure 12:
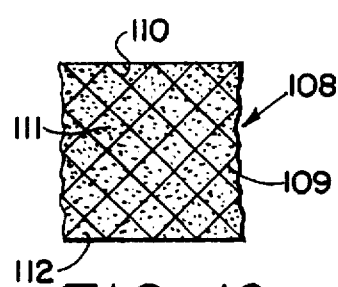

In FIG. 12 there is illustrated a tool shown generally at 108 which may be taken from the mold as a solid block and then subjected to a series of parallel crisscross cuts as indicated at 109 and 110. The cuts are uniformly spaced and form in the center projecting fingers of square transverse cross section as seen at 111, and at the long edges, fingers of triangular transverse cross section indicated at 112. The widths of the cut may vary from very fine, as illustrated, to relatively wide, depending upon the cutting tool employed. In any event, the tool of FIG. 12 is formed initially with the injection process illustrated, either in whole or in part with abrasive, and then subjected to the cutting pattern to form the compacted finger tip working face illustrated.

Figure 13:
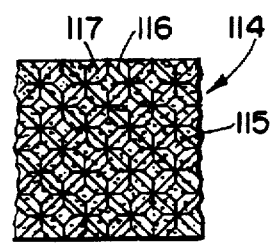

The tool face shown generally at 114 in FIG. 13 is comprised of a surface which may be made partially by injection and partially by cutting. The injection process forms regular square truncated pyramid tips indicated at 115 which again are arranged in diagonal rows with respect to the long edges of the tool. After the pyramid tips are formed, the working face may be cut along diagonal lines 116 and 117 separating the pyramid tips and forming separate fingers each of which has the tip configuration noted. Thus, the working face of the tool of FIG. 13 may be formed by a combination of molding and cutting. The diagonal angle at which the pyramid tips are formed or the cutting takes place may vary from 45° to a sharper angle such as 60° or to the 90° angle seen in FIG. 14. Again the depth and width of the cut controls the flexibility of the fingers as well as the amount of coolant flow passing the tips of the working face.

Figure 14:
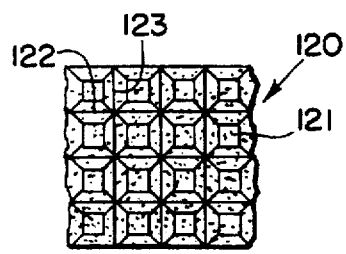

In FIG. 14 there is illustrated a tool face shown generally at 120 which comprises square regular truncated pyramids which are separated by longitudinal cuts 122 and transverse or right angle cuts 123. It is noted that the tips in FIG. 14 are somewhat larger than the tips of FIG. 13. In either form, the tips are formed by a combination of molding and cutting and the depth of penetration and width of the cutting tool may control the space between the fingers formed which in turn controls both the flexibility or softness of the tool face as well as the coolant or fluid flow.

Figure 15:
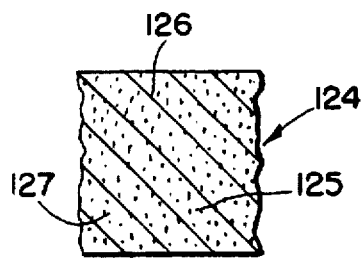

In FIG. 15 there is illustrated a more simplified tool 124 which is somewhat similar to the tool illustrated in FIGS. 8, 9 and 10. In the tool 124, the tool is initially formed by injection as a solid block and the working face 125 is diagonally slit as indicated at 126 to form parallel relatively wide adjacent fingers 127. Again, the depth and the width of the slitting process may be employed to control the operational characteristics of the honing tool.

Figure 18:
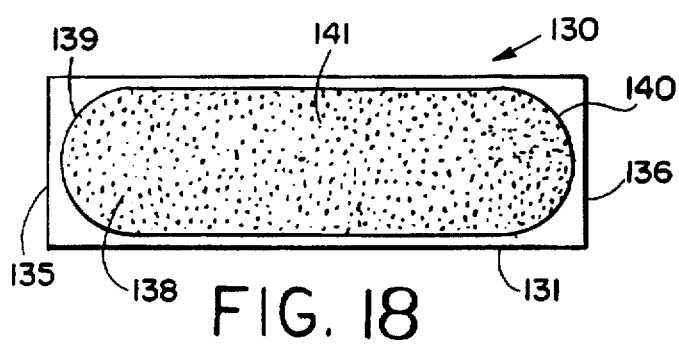
FIG. 18 is a top plan view of the tool of FIG. 16.
Figure 16:
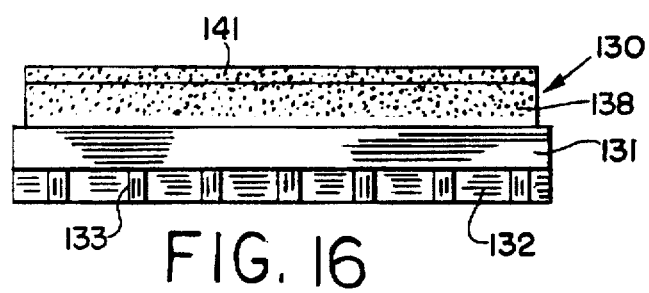
FIGS. 16 is a side elevation of another form of honing tool made with the present invention.
Figure 17:
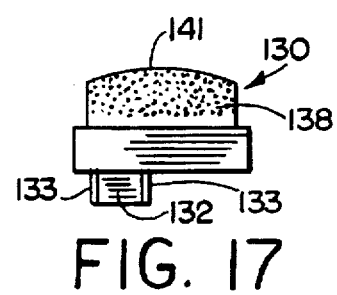
FIG. 17 is an end elevation of the tool of FIG. 16.

With reference to FIGS. 16, 17 and 18, there is illustrated another type of honing tool which can be made with the process of the present invention. The tool is illustrated generally at 130. The tool 130 includes a rectangular base 131, from the bottom of which projects an offset mounting fin 132 which has projections 133 on each side. The tool is mounted on the head by means of the mounting fin. The base 131 is somewhat wider and each end of the base is square as seen at 135 and 136. The projecting portion from the outside of the base indicated at 138 has rounded ends seen at 139 and 140 and terminates outwardly in the arcuate working face 141. Again, the tool is elongated but wider than other forms of honing tools. As illustrated, the honing tool is formed entirely by the injection process and the abrasive homogeneous mix may be incorporated only in the projecting portion as illustrated to the working face or, may be incorporated throughout the entire tool, depending upon the process employed. Again, the working face may be treated as described in connection with FIGS. 8 through 15.

Figure 19:
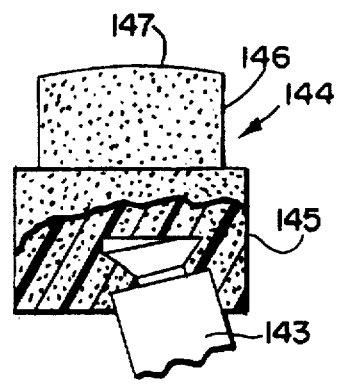
FIG. 19 is a fragmentary illustration broken away and in section of a tool in accordance with the present invention with a machine mounting insert installed.

Referring now to FIG. 19, some honing tools are mounted in the honing machine head by means of posts such as illustrated at 143. These posts may be mounted in the molds such that the honing tool 144 is molded around the end of the post. Thus the honing tool 144 includes a base 145 from which the mounting post 143 projects. The honing tool also includes the projecting portion 146 terminating in the working face 147. The working face may be treated as in the embodiments described above. Alternatively, the post 143 may be mounted in an insert nut which is in turn mounted on a pilot in the mold so that the finished tool will have an exposed nut in the bottom, to which a separable post 143 may quickly be attached.

Figure 20:
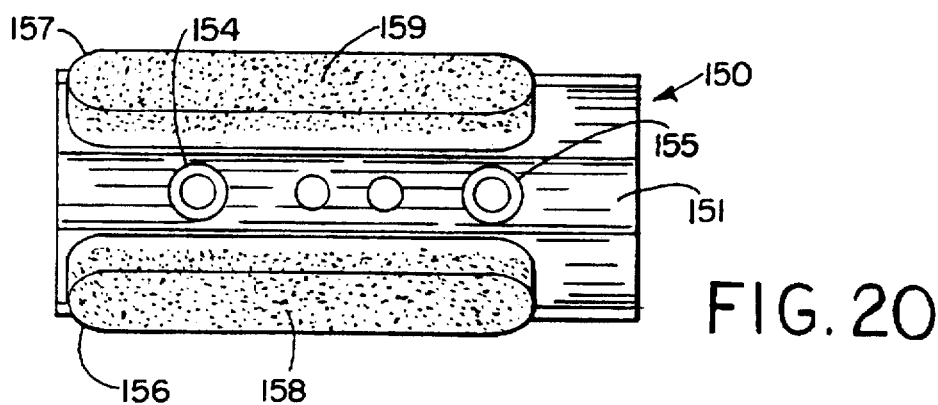
FIG. 20 is a top plan view of a dual honing tool made in accordance with the present invention.
Figure 21:
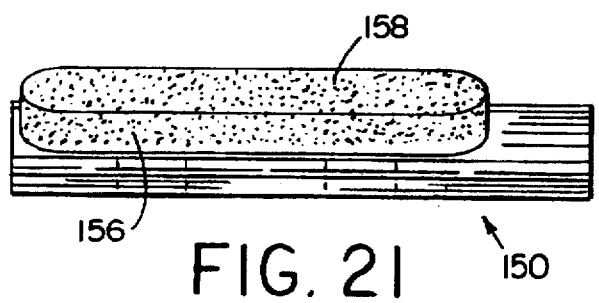
FIG. 21 is a side elevation of the tool of FIG. 20; and, FIG. 22 is a end view of the tool of FIG. 20.
Figure 22:
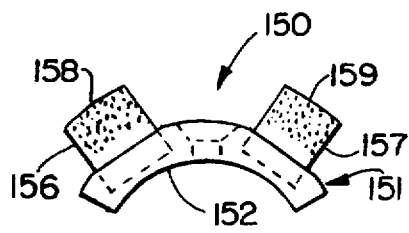

FIGS. 20, 21 and 22 illustrate another type of honing tool shown at 150 which may be made with the process of the present invention. The tool 150 includes a generally cylindrical base 151, the interior or bottom of which is circular as indicated at 152. The tool is designed to be mounted on the rotating shaft of a honing machine holder by fasteners extending through the counter sunk holes 154 and 155, which are axially aligned in the center of the base.

On each side of the mounting holes are two spaced parallel projections 156 and 157 which terminate in respective working faces 158 and 159. The tool may be formed by the process with entire tool including the base being formed of the plastic-abrasive mix or just the outer portions of the projections such as illustrated are formed with the plastic-abrasive mix. In any event, the entire tool is formed by the injection process and the working faces may be plain, as illustrated, or formed by the injection process, or the cutting process, or both.

In any event, the various embodiments of the process of the present invention may be employed to produce a wide variety of honing tools with a wide variety of working faces, all of which simulate the closely packed tips of the prior art honing tools described above.

With the present invention a wide variety of abrasive minerals or materials may be employed. For example, the materials may be aluminum oxide, aluminum silicate, or silicon carbide and the mesh size may vary widely from about 80 mesh to 1000 mesh and above. The abrasive is homogeneous entrained in the synthetic plastic material and may be up to about 30 to about 45% by weight of the plastic melt. The process illustrated in FIG. 1 or FIG. 3 will normally be used only with higher cost super abrasives such as diamond material or cubic boron nitride (CBN).

As the plastic material which forms the melt, the material preferably has a Young's modulus greater than 0.10 at $10^6$ and more preferably greater than 0.40 at $10^6$. Young's Modulus is defined as the amount of force a material can undergo without permanent deformation when the force is removed. This is a measure of elasticity or the relationship of stress over strain.

The preferred plastic for the injection process is nylon. The preferred nylon is 6/12 nylon. Nylons are long-chain partially crystalline synthetic polymeric amides (polyamides). Polyamides are formed primarily by condensation reactions of diamines and dibasic acids or a material having both the acid and amine functionality.

Nylons have excellent resistance to oils and greases, in solvents and bases. Nylons have superior performance against repeated impact, abrasion, and fatigue. Other physical properties include a low coefficient of friction, high tensile strength, and toughness. Useful mechanical properties of nylon include strength, stiffness and toughness. In general, the greater the amount of amide linkages, the greater the stiffness, the higher the tensile strength, and the higher the melting point. Several useful forms of nylon are available and include:

A. Nylon 6/6 synthesized from hexamethylenediamine (HMD) and adipic acid;

B. Nylon 6/19 synthesized from HMD and azelaic acid;

C. Nylon 6/10 synthesized from HMD and sebacic acid;

D. Nylon 6/12 synthesized from HMD and dodecanedioic acid;

E. Nylon 6 synthesized from polycaprolactam;

F. Nylon 11 synthesized from 11-aminoundecanoic acid;

G. Nylon 12 synthesized from polyaurolactam; and others.

Nylons useful in the present invention have Young's modulus greater than 0.05, preferably greater than 0.1 and preferably greater than 0.2.

The physical properties of the preferred nylon 6/12 include a melting point of 212° C., a dry yield strength at $10^3$ psi of 8.8 (7.4 at 50% RH), a dry flexural modulus of 295 (180 at 50% RH). Nylon has a higher Young's modulus (0.40 at $10^6$ psi) than rubber (0.01 at $10^6$ psi), which demonstrates the greater stiffness of nylon over an elastomer such as rubber, for example.

Nylon is partially crystalline, hence has little or no rubbery regions during deformation. The degree of crystallinity determines the stiffness and yield point. As the crystallinity decreases the stiffness and yield stress decreases. Rubber, on the other hand, is an amorphous polymer and its molecular straightening leads to a low modulus of elasticity.

Nylon has a tensile strength of over 8000 psi, rubber has a tensile strength of 300 psi. Nylon exhibits 250% breakage during elongation, rubber exhibits 1200%. Nylon has fair moisture resistance, yet rubber absorbs a large amount of water. Nylon has excellent resistance to oil and greases and other organic solvents, rubber has extremely poor resistance.

Nylon retains its properties from −75° F. to 230° F., while rubber has a narrow range around room temperature. Nylon's increased strength, resistance to moisture and solvents, and its wide usable temperature range make it the preferred material for the process and tool disclosed.

The plastic material may include aramids or more particularly include aramid fibers which are characterized by high tensile strength and high modulus. Two aramids that may be useful in the present invention include those formed from the polymerization of p-phenylenediamine with terephthaloyl chloride and a less stiff polymer formed from the polymerization of the m-phenylenediamine and isophthaloyl chloride.

Aramids demonstrate a very strong resistance to solvents. Aramids have tensile strengths at 250° C. that are exhibited by textile fibers at room temperature.

Also, some thermoset polymers are useful. Polyesters are an example and are long chain synthetic polymers with at least 85% of a dihydric alcohol ester (HOROH) and terephthalic acid (p-$HOOCC_6H_4COOH$). Polyesters contain both crystalline and non-crystalline regions. Polyesters are resistant to solvents and demonstrate a breaking elongation of 19–40%.

Polyimides are polymers containing (CONHCO) and are also useful in the present invention. High temperature stability (up to 700° F.) and high tensile strength of 13,500 psi make polyimides useful as the melt of the present invention.

Additions to the plastic melt may be incorporated such as fillers, or reinforcing elements, such as short aramid or glass fibers. The additions may be added to reduce costs or increase performance.

It can now been seen that there is provided a process for producing a very sophisticated honing tool at low economic cost and yet with a wider variety of working faces, while at the same time producing such tools consistently and of high quality.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A method of making a honing tool comprising the steps of mixing a plastic melt and abrasive into a homogeneous mixture, injecting such mixture into a mold at high pressure to form a honing tool, cooling the mixture, and removing the tool from the mold, the working face of the honing tool formed by the injection process being plane, and then treating such plane working face following injection further to form the working face of the honing tool as discrete projections.

2. A method of making a honing tool comprising the steps of mixing a plastic melt and abrasive into a homogeneous mixture, injecting such mixture into a mold at high pressure to form a honing tool, cooling the mixture, and removing the tool from the mold, the working face of the honing tool formed by the injection process being plane, and then treating such plane working face following infection further to form the working face of the honing tool, said treating step comprising cutting the working face to form individual finger tips at the working face.

3. A method as set forth in claim 2 wherein said working face is elongated and said cutting forms parallel cuts diagonally of the direction of elongation.

4. A method as set forth in claim 3 wherein said parallel cuts diagonally crisscross the working face.

5. A method as set forth in claim 4 wherein said diagonally crisscross cuts are at about 45° to the direction of elongation of the working face.

* * * * *